(12) United States Patent
Staver

(10) Patent No.: US 9,696,212 B2
(45) Date of Patent: Jul. 4, 2017

(54) HIGH EFFICIENCY COHERENT IMAGER

(71) Applicant: BAE Systems Information And Electronic Systems Integration Inc., Nashua, NH (US)

(72) Inventor: Philip R. Staver, Wilton, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 92 days.

(21) Appl. No.: 14/811,984

(22) Filed: Jul. 29, 2015

(65) Prior Publication Data
US 2016/0036535 A1 Feb. 4, 2016

Related U.S. Application Data

(60) Provisional application No. 62/030,854, filed on Jul. 30, 2014.

(51) Int. Cl.
*H04B 10/64* (2013.01)
*G01J 9/04* (2006.01)

(52) U.S. Cl.
CPC ........................................ *G01J 9/04* (2013.01)

(58) Field of Classification Search
CPC .......... G02B 2006/1215; G02B 6/2821; G02B 6/2861; G02B 2006/12147; G02B 2006/12164; G02B 6/04; H04J 14/02
USPC ........................................................ 398/207
See application file for complete search history.

(56) References Cited

U.S. PATENT DOCUMENTS

| 4,417,813 | A | | 11/1983 | Bartholomew | |
|---|---|---|---|---|---|
| 6,137,572 | A | * | 10/2000 | DeFreez | G01N 15/0205 356/336 |
| 7,561,813 | B2 | | 7/2009 | Jackson | |
| 2007/0236679 | A1 | * | 10/2007 | Luo | G01S 17/36 356/4.01 |
| 2010/0309467 | A1 | * | 12/2010 | Fox | G01J 3/02 356/326 |

(Continued)

OTHER PUBLICATIONS

Radiometry and the Detection of Optical Radiation, Robert W, Boyd, pp. 196-210, John Wiley & Sons, 1983.

(Continued)

*Primary Examiner* — Don N Vo
(74) *Attorney, Agent, or Firm* — Sand & Sebolt, LPA; Scott J. Asmus

(57) ABSTRACT

An extended field heterodyne detection apparatus comprises a local signal oscillator, a micro-lens array set in optical relation to the local signal oscillator to multiplex a beam from the local signal oscillator, a local oscillator injection lens in the optical path of the local oscillator and the micro-lens array, a semi-reflective beam splitter at the telecentric stop of the local oscillator injection lens to reflect the beam of the local oscillator in parallel to a signal beam passing through the semi-reflective beam splitter, an objective lens, with a stop, located at the semi-reflective beam splitter, and a focal plane array, situated to receive the source beam. The extended field heterodyne detection apparatus solves the problem of creating a local oscillator beam that is mode-matched for an incoming signal beam, for the eventual process of mixing both the signal beam and the local oscillator using a conventional, square-law detector.

18 Claims, 3 Drawing Sheets

(56) References Cited

U.S. PATENT DOCUMENTS

2014/0199065 A1* 7/2014 Bratkovski ........ H04B 10/2581
398/44

OTHER PUBLICATIONS

Heterodyne Detection: Phase Front Alignment, Beam Spot Size, and Detector Uniformity, Steven C. Cohen, Applied Optics, vol. 14, No. 8, pp. 1953-1959, Aug. 1975.
Handbook of Optical Metrology: Principles and Applications, Toru Yoshizawa ed., CRC Press, 2000, chapter 10.
Contemporary Topics in Optical Imaging Processing With Matlab, Ting-Chung Poon & Parth P. Banerjee, Elsevier Science Ltd, 2001. Chapter 5 and Chapter 7 (pp. 207-256).
Infrared Heterodyne Detection, M. C. Teich, Proceedings of the IEEE, Jan. 1968.
Acousto-optic image processing, Balakshy and Kostyuk, Applied Optics, vol. 48, No. 7, Mar. 1, 2009.
Coherent imaging with two-dimensional focal-plane arrays: design and applications, Simpson, Bennett, Emery, Hutchinson, Miller, Richards, and Sitter, Applied Optics, vol. 36, No. 27, Sep. 20, 1997.
Three-dimensional points spread functions of an optical heterodyne scanning image processor. Ting-Chung Poon and Guy Indebetouw, Applied Optics, vol. 42, No. 8, Mar. 10, 2003.
The Antenna Properties of Optical Heterodyne Receivers, A. E. Siegman, Applied Optics, vol. 5, No. 10, Oct. 1996.

* cited by examiner

HIGH EFFICIENCY COHERENT IMAGER

CROSS REFERENCE TO RELATED APPLICATION

This application claims the benefit of U.S. Provisional Patent Application Ser. No. 62/030,854, filed on Jul. 30, 2014; the disclosure of which is entirely incorporated herein by reference.

BACKGROUND

Technical Field

The present disclosure relates generally to optical detection. More particularly, the present disclosure relates to heterodyne detection of images. Specifically, the present disclosure relates to an extended field heterodyne detection apparatus.

Background Information

Optical heterodyne detection of a modulated input signal occurs through mixing the input signal with a stable, fixed frequency signal (often called a local oscillator) in a device such as a tube, transistor, or diode mixer to create an output signal. The combination of the two signals may then produce an output signal that is either equal to either the sum or the difference of the two input frequencies. The output signal may then be filtered, rectified, and/or amplified. The output signal may also be analyzed to determine the frequency, amplitude, or phase of the input signal and thereby yield an image or other useful information based on the input signal. This process may allow the detection of otherwise undetectable high frequency signals, and has a tremendous variety of uses, such as applications in military (thermal imaging, target tracking, surveillance, communications, etc.), atmospheric analysis, and astronomy, just to name a few.

Heterodyne detection may be done passively or actively. In passive detection, the input signal consists of the background radiation derived from a target. The background radiation would then be heterodyned with a local oscillator signal to create the heterodyned signal. In active detection, a reference signal, such as a laser, may be directed toward and reflected off of the target. The signal that is reflected from the target will be modulated by the target. The reflected signal may then be heterodyned with a local oscillator to create the heterodyned signal. In both passive and active detection, properties of the target may be determined via analysis of the heterodyned signal.

One of the objectives of an optical system utilizing heterodyne detection is to increase the signal-to-noise-ratio of the system, which is the ratio of the magnitude of the signal to the magnitude of the noise present in the system. As unwanted radiation is filtered from the system, a theoretical best noise may be achieved through heterodyne detection. In this regard, heterodyne systems may become very sensitive and much more effective because unwanted noise may be reduced or eliminated.

SUMMARY

Currently, heterodyne detection has two significant limitations. First, efficient heterodyne detection has typically only been possible for point sources. For example, a given system may allow detection of a single field point in order to determine properties of that point, such as for three dimensional shape measurements. Thus, present systems only accomplish heterodyne detection for single point sources, and not over a large field of view. A second weakness of current heterodyne systems is due to resultant astigmatisms, interference fringes, aberrations and/or other optical flaws that reduce the effectiveness of the system. Such optical flaws are a result of system design and configuration. In these respects, heterodyne detection has heretofore been limited in its utility.

Issues continue to exist with limitations in heterodyne detection. For instance, one exemplary problem with the apparatus identified in U.S. Pat. No. 7,561,813 is that the local oscillator beam, that is combined with the signal beam, is collimated, whereas the signal beam is focused onto the detector with a convergent beam. This means that the overall efficiency of the interference process will be drastically reduced. This is because the interference process requires that both the signal beam and the local oscillator beam be mono-mode, and phase-matched. The present disclosure addresses these and other issues.

In one aspect, an embodiment may provide an extended field heterodyne detection apparatus, comprising: a local signal oscillator, with an exit; a micro-lens array, set in optical relation to the local signal oscillator, situated to multiplex a beam from the local signal oscillator; a local oscillator injection lens, in the optical path of the local oscillator and the micro-lens array; a semi-reflective beam splitter at the telecentric stop of the local oscillator injection lens, situated to reflect the beam of the local oscillator in parallel to a signal beam passing through the semi-reflective beam splitter; an objective lens, with a stop, situated such that the stop is located at the semi-reflective beam splitter; and a focal plane array, situated to receive the source beam.

In another aspect, an embodiment may provide an extended field heterodyne detection apparatus comprising: a local signal oscillator having an exit; an oscillated first beam transmitted from the exit of the local signal oscillator along an optical first path; a micro-lens array set in optical relation with the local signal oscillator multiplexing the oscillated first beam; a local oscillator injection lens in optical relation with the micro-lens array; a first stop in optical relation with the local oscillator injection lens, wherein the local oscillator injection lens is interposed optically between the micro-lens array and the first stop; a signal second beam transmitted from a target field of view along an optical second path, wherein the optical first and second paths intersect at the first stop; a semi-reflective beam splitter positioned at a similar location as the first stop where the optical first and second paths intersect and the beam splitter reflecting the oscillated first beam parallel to the signal second beam passing through the semi-reflective beam splitter; an objective lens set in optical relation with the beam splitter; a second stop in optical relation with the first stop and the second stop positioned at a similar location as the first stop; a focal plane array positioned in optical relation with the first and second stop; an optical third path extending from the first stop to the focal plane array; a combined beam formed from a combination of the oscillated first beam parallel to the signal second beam transmitting along the optical third path to the focal plane array, wherein the oscillated first beam and the signal second beam forming the combined beam are parallel at focal plane array such that the oscillated first beam is mode-matched with the signal second beam.

In another aspect, an embodiment may provide a method comprising the steps of: receiving a multiplexed first beam from a local signal oscillator at a beam splitter; receiving a signal carrying second beam from an object field at the beam splitter and wherein the first beam is mode-matched to the signal second beam; propagating the first and second beams collimatedly from the beam splitter to a focal point array, wherein the first beam and the second beam are parallel at the focal point array. This method may further include the steps of mixing the first and second beams in a square-law detector, wherein each pixel in the focal plane array is mixed simultaneously.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

As a further background, the prior art known before this disclosure for a direct or conventional optical detection process involves the conversion of photons into a detection signal (usually measured in charge carriers, current, or voltage) inside an electronic square-law detector, which produces a signal that is proportional to the square of the incoming electric field. In this prior art process, the phase information of the incoming signal is altogether lost, once the signal beam enters the detection medium, which may be a photomultiplier tube, a PIN photo-diode, or, for imaging applications, a CID or CCD detector array.

Figure 1:
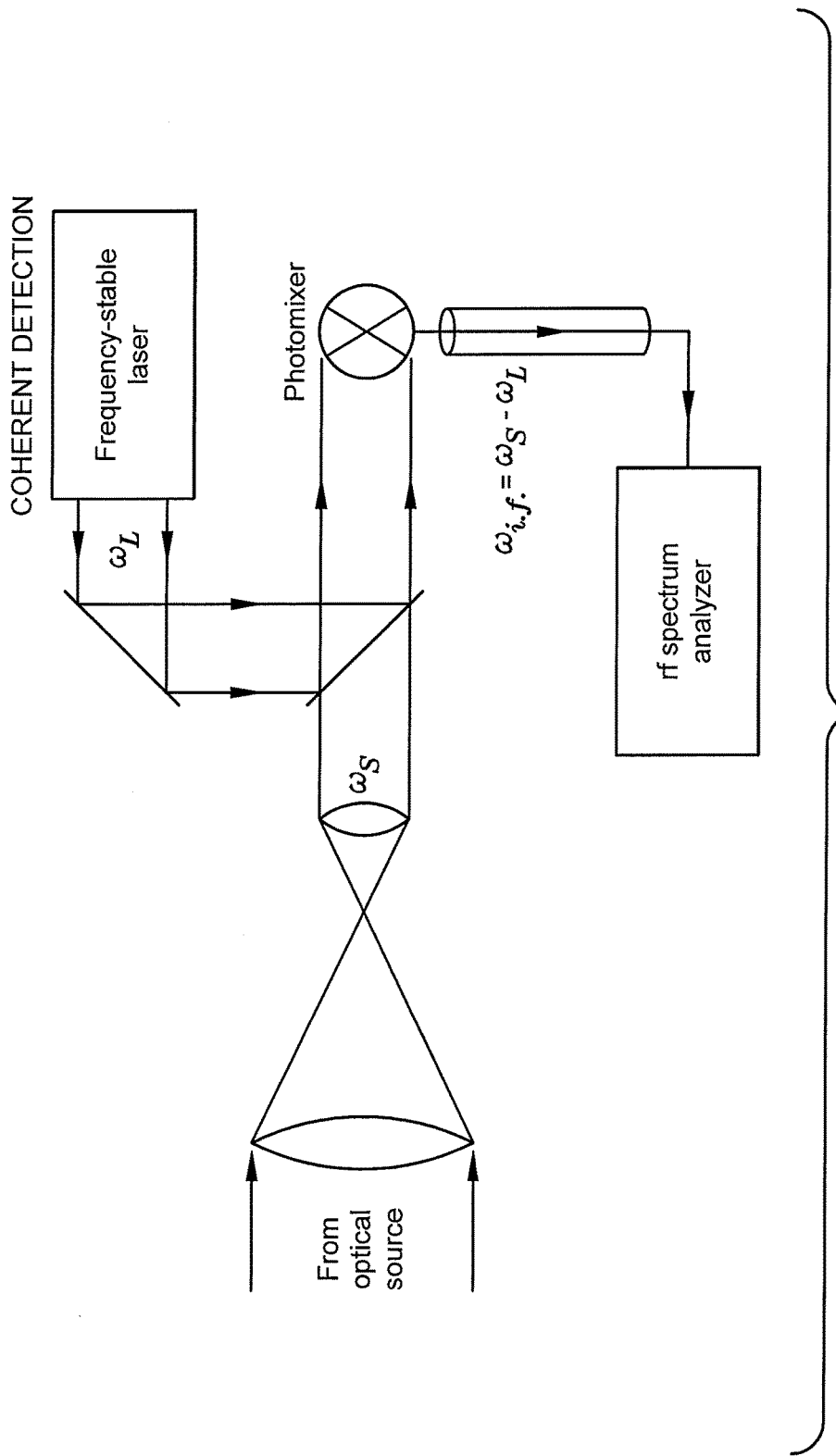
FIG. 1 is an exemplary schematic view of a prior art optical heterodyne receiver.

As depicted in FIG. 1, the prior art provides, in contrast to the statements immediately above, a coherent, or heterodyne detection process which measures an optical signal without losing the phase information that is present in the incoming optical signal. This process and device is illustrated schematically in FIG. 1, which is reproduced from the reference: Radiometry and The Detection of Optical Radiation, Robert W. Boyd, pp. 196-210, John Wiley & Sons, 1983.

One chief advantage of the heterodyne detection process is that the signal produced by the detector, in this process, has a component that is proportional to the product of the power in the signal beam and the power of the local oscillator beam. This allows the detection device itself to control the overall measured signal level. Furthermore, this detection method preserves the relative phase of the incoming signal beam and the local oscillator beam and therefore allows for a substantial improvement in the spatial resolution of optical path length measurements.

Figure 2:
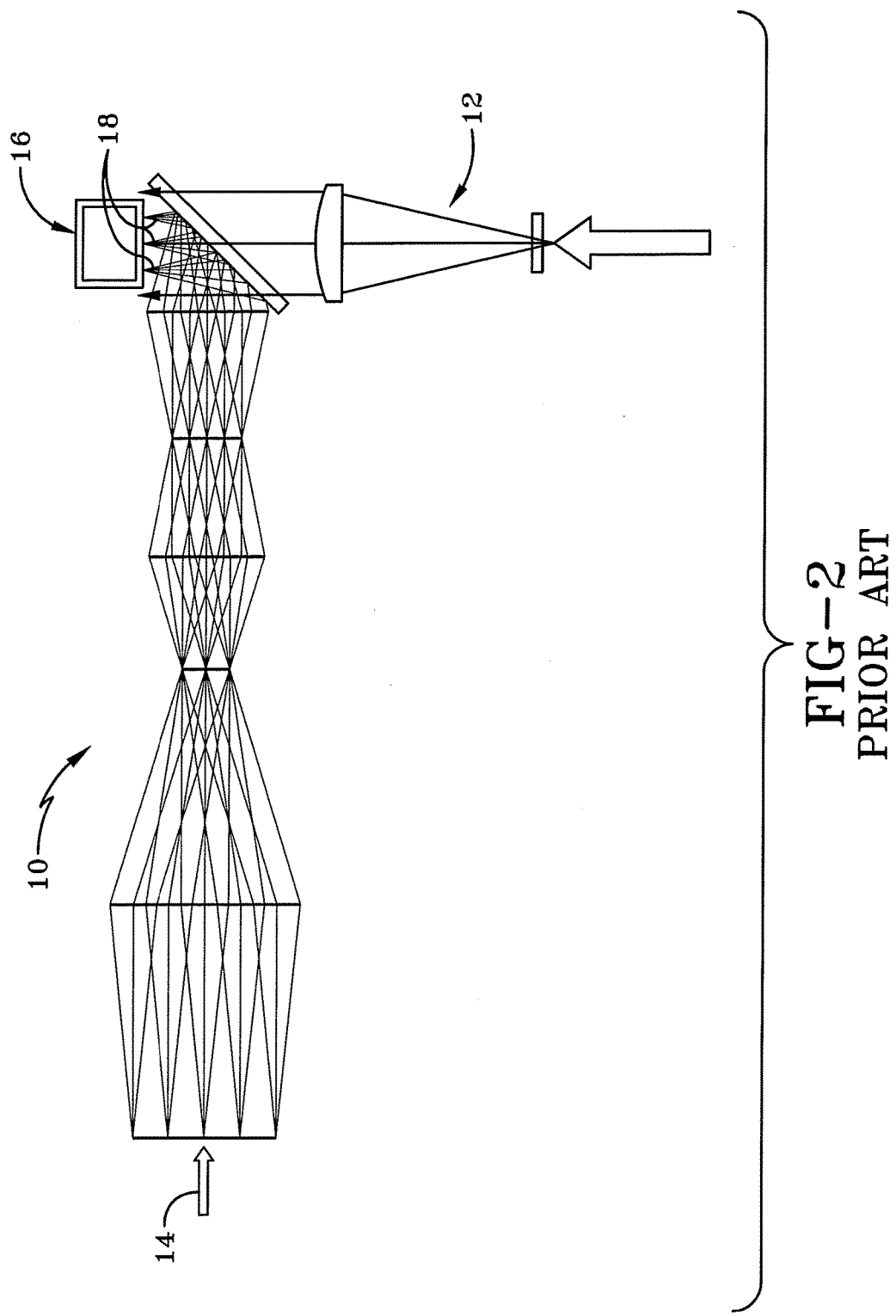
FIG. 2 is an exemplary schematic view of another prior art optical heterodyne receiver.

As mentioned briefly above, one exemplary problem with the apparatus 10 identified in U.S. Pat. No. 7,561,813 and reproduced in FIG. 2 is that the local oscillator beam 12, that is combined with the signal beam 14, is collimated, whereas the signal beam 14 is focused onto the detector 16 with a convergent beam 18. Stated otherwise, a collimated local oscillator beam 12 is introduced in a region where the signal beam 14 is convergent 18. Therefore, the combination is only efficient in a small percentage of each signal beamlet focusing on the detector. This means that the overall efficiency of the interference process will be drastically reduced. This is because the interference process requires that both the signal beam and the local oscillator beam be mono-mode, and phase-matched. The efficiency of the mixing process is described in the journal article entitled: "Heterodyne detection: phase front alignment, beam spot size, and detector uniformity", Steven C. Cohen, Applied Optics, Vol. 14, No. 8, August 1975.

While the prior art of FIG. 1 depicts a heterodyne detection device and process for a single, incoming collimated beam, it is desirable to perform this process over an extended field of view, such as that obtained with a staring, two dimensional detector. The chief problem that needs to be solved in order to accomplish this is the task of creating a local oscillator that is accurately mode-matched (having the same diameter and phase curvature) with the incoming signal beam. This must be done for each and every point in the detection field of view simultaneously. Since the number of points in the field of view may be large (for example 128×128 or more), and each beam focuses onto the detector with a different geometry, the number of local oscillator beams required for this process may be insurmountable. That is, if there is no method to derive them from a single laser beam.

The problem that the present device solves is the problem of creating a local oscillator beam that is mode-matched for the incoming signal beam, for the eventual process of mixing the signal beam and the local oscillator using a conventional, square-law detector. Furthermore, the device will do this for each pixel in an area detector, for all pixels simultaneously, and do this by using only a single collimated laser source.

Two beams are "mode matched" when the two beams have the same amplitude and phase across common apertures. The common apertures are where two beams overlap each other. This overlap allows and causes the most efficient combination of two beams. When two beams are in phase with each other, their amplitudes add in together in total. If the two beams are not in phase (or completely out of phase), they do not combine together as efficiently as if they were completely in phase. In the extreme case when they are out of phase, they cancel each other completely, and in that case there will be no signal created in a detector.

Figure 3:
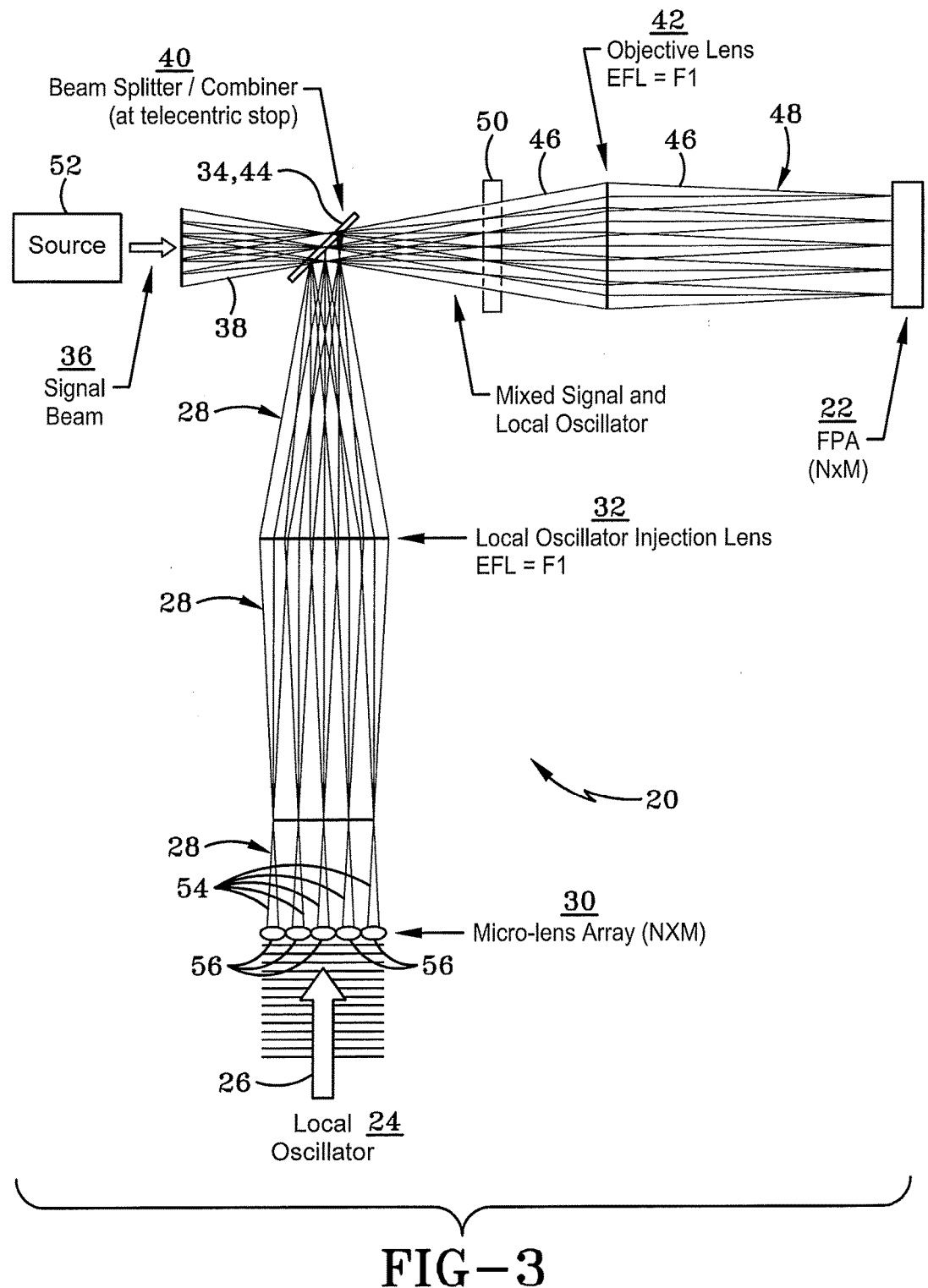
FIG. 3 is a schematic view of an exemplary embodiment of a heterodyne receiver of the instant disclosure.

As depicted in FIG. 3, an extended field heterodyne detection apparatus 20 describes a receiver optical system that performs this heterodyne detection process over a field of view, using a 2D array detector 22. In this detection apparatus, a local oscillator 24 is comprised of a single laser device with a collimated beam.

With continued reference to FIG. 3, an extended field heterodyne detection apparatus 20 includes: a local signal oscillator 24 having an exit; an oscillated first beam 26 transmitted from the exit of the local signal oscillator along an optical first path 28; a micro-lens array 30 set in optical relation with the local signal oscillator 24 multiplexing the oscillated first beam 26; a local oscillator injection lens 32 in optical relation with the micro-lens array 30; a first stop 34 in optical relation with the local oscillator injection lens 32, wherein the local oscillator injection lens 32 is interposed optically between the micro-lens array 30 and the first stop 34; a signal second beam 36 transmitted from a target field of view along an optical second path 38, wherein the optical first and second paths 28, 38 intersect at the first stop 34; a semi-reflective beam splitter 40 positioned at a similar location as the first stop 34 where the optical first and second paths 28, 38 intersect and the beam splitter 40 reflecting the oscillated first beam 26 parallel to the signal second beam 36 passing through the semi-reflective beam splitter 40; an objective lens 42 set in optical relation with the beam splitter 40; a second stop 44 in optical relation with the first stop 34 and the second stop 44 positioned at a similar location as the first stop 34; a focal plane detector array 22 positioned in optical relation with the first and second stop 34, 44; an optical third path 46 extending from the first stop 34 to the focal plane array 22; and a combined beam 48 formed from a combination of the oscillated first beam 26 parallel to the signal second beam 36 transmitting along the optical third path 46 to the focal plane array 22, wherein the oscillated first beam 26 and the signal second beam 36 forming the combined beam 48 are parallel at the focal plane array 22 such that the oscillated first beam 26 is mode-matched with the signal second beam 36.

One particular embodiment of apparatus 20 is depicted in FIG. 3. In this figure, the collimated signal beam 36 comes from a hypothetical target that encompasses some field of view. This field of view is imaged onto a 2-dimensional array detector 22 having N×M pixel elements where N and M represent the number of pixels in the two orthogonal directions on the device. A feature of this configuration is that the first stop 34 is placed at the front focal plane of the objective lens 42, making the optical system telecentric in object space. With further reference to the focal plane detector array 22, when looking in the direction of travel of light, the "front focal plane," is a place in front of the lens where light emanating from a infinitesimally small point, would come out of the back of the lens as a collimated beam. The "back focal plane," is the opposite. The back focal plane is where a collimated incoming beam would become focused to an infinitesimally small point. The "back focal plane," is normally called "the focal plane". It is where the detector array 22 is located. This detector is denoted "FPA," in FIG. 3, which stands for "focal plane array."

At the location of this first stop 34, there is also placed a partially-reflective beam splitter 40, which allows the local oscillator beam to be combined with the signal beam. The beam splitter 40 is also the beam combiner. The beam splitter 40 is commonly purchased as a "beam splitter," but the device functions as both a combiner and splitter. The telecentric first stop 34 is an edge of the circular aperture of the beam splitter/combiner. The edge defining the telecentric first stop 34 bounds a surface on the beam splitter/combiner. The first stop 34 and the splitter/combiner reside at the same location because they are different parts of the same component. In one exemplary embodiment, if the telecentric stop is an edge of an iris, the "stop" is the edge of the circular aperture, but the "stop surface," is the plane that contains the iris structure.

The beam splitter 40 (that performs splitting and combining functions is partially reflective. The reflective character of the splitter could be any ratio of values of transmission relative to reflection. Commonly, it might be 50%/50% (transmission/reflectance). However, the value of this amount might be chosen as a consequence of a detailed engineering analysis of a particular application of this invention. For example, there may be some applications where 10%/90% is best, or 90%/10% is best in others, or some other value.

The angle of the splitter/combiner (depicted in FIG. 3 as 45 degrees) could be any value as long as the relative position of the signal beam, local oscillator beams, and the beam entering the objective lens are oriented in reasonable orientations, as not to interfere with each other.

Note that although FIG. 3 depicts a configuration in which the beam splitter 40 is located at the entrance pupil, there could be relay lenses 50 interposed between the objective lens 42 and the beam splitter 40 to relay the image to the first stop 34 onto the beam splitter 40, if it is advantageous to do so. The terms "entrance pupil" and "first stop" refer to two different things that are located at the same place. The entrance pupil is the place in an optical system where all of the incoming light passes through on its way toward the optical system in question (in this case, it is the objective lens). In this disclosure, there is nothing of significance located at the exit pupil, however it is entirely possible. The exit pupil is located where the entrance pupil would appear to be located when you viewed the stop through the objective lens from the side nearest the detector. In this particular embodiment, there is nothing located in this position other than a virtual image of the stop.

In practice, the terms "entrance pupil" and "first stop" sometimes may be used interchangeably, however they can refer to two different things. In this disclosure, they are the same thing because the first stop 34 forms the entrance pupil. This is not always the case. For example, in human eye, the "stop" is the human iris. The entrance pupil would be the place where the iris appears to be located when you look into the eye from the outside. Because of the focal power of the curved corneal surface, the iris will appear to be located (with respect to the corneal vertex) at a location different than it actually is. This virtual location is the entrance pupil.

The type of stop utilized herein as first stop 34 is a "field stop," located at the front focal plane of the objective lens 42 denoted the "objective lens", shown in FIG. 3. Because this first stop 34 is located at the front focal plane of the objective lens 42, it is also referred to as a telecentric field stop. The location of the beam combining optics (i.e., beam splitter 40) at this location is what facilitates the combination of multiple local oscillator beamlets with all of the field points received by each pixel element in the receiver's field of view. There are also (implicit) aperture stops in the receiver lens, the objective lens, and in the local oscillator.

The incoming signal beam 36 comes from a laser source 52. The laser source 52 transmits a small amount of a laser toward the desired object that is to be viewed at by a receiver. A small percentage of the transmitted laser beam reflects off the desired object and returns as the signal beam 36. The "local oscillator" is also a small part of this laser source that is mixed with the signal beam in a manner described by this disclosure.

In order to construct a local oscillator beamlet array 54 that can be combined (or mixed) with each point in the field of view of the focal plane array 22, a single, collimated laser source is passed through a micro lens array 30 having a plurality lenslets 56 to split the beam into a plurality of beamlets 54. The micro-lens array 30 has the same number of lenslets 56 as number of pixels in the detector array 22. One non-limiting exemplary micro-lens array is commercially known as 10 mm×10 mm High-Quality Microlens Array and available for sale by Thorlabs, Inc. of Newtown, N.J. These exemplary micro-lens arrays may be obtained in an unmounted configuration or in a Ø1" Mount. A variety of wavelength ranges are available and suitable for use, such as a range from 400 nm to 900 nm with an anti-reflective (AR) coating, or a range from 300 nm to 1100 nm with a chrome mask. Some micro-lens arrays are fabricated from fused silica substrate. Fused silica offers excellent transmission characteristics from the UV to the IR. The micro-lens arrays have a plano-convex shape and may be arranged in a square grid with a lens pitch of 150 μm or 300 μm. The arrays may have a pitch of 150 μm have round lenslets. The arrays with a pitch of 300 μm have square lenslets, allowing for a fill factor of 100%. One exemplary lens array and its mounted counterpart may have a chrome mask that blocks light from being transmitted through the spaces between microlenses, thereby increasing the contrast. Another exemplary lens arrays and its mounted version may have a broadband AR coating on both sides to reduce the surface reflections in the 400-900 nm spectral region to below 1%. These lenses may be formed using photolithographic techniques based on semiconductor processing technology, which allows for excellent uniformity in the shape and position of each micro-lens. In some mounted versions, the micro-lens array is glued into a Ø1", 3.5 mm thick mount plate that is compatible with all standard Ø1" optics mounts. The aperture of the lens window may be 9 mm×9 mm. Their unmounted counterparts are most easily held using one of our cylindrical lens mounts, which are specifically designed to hold square or rectangular optics.

The micro-lens array 30 multiplexes the oscillator beam 26. With respect to multiplexing, when a collimated beam 26 passes through the micro-lens array 30, each lenslet 56 produces a tiny focus of the part of the incident beam that passes through each of the lenslet apertures. If the lens array is comprised of 100×100 lenslets, each 100 microns across, then collimated beam will be split into 10,000 beamlets 54 that are all focused at each of the foci of the lens array members.

The split (i.e., multiplexed) beamlets 54 formed from the micro-lens array are then imaged onto the FPA 22 through the beam splitter 40 using the oscillator injection lens 32 that might have the same focal length as the objective lens 42. Constraints on the focal length of this lens are discussed below. The characteristics of this micro-lens array 30 is as follows: It should produce the same number of beamlets 54 as the number of pixel elements in the focal plane array and the F/number of each lenslet 56 should be the same as the F/number of the objective lens 42.

The configuration depicted in FIG. 3 benefits from telecentricity. The telecentric embodiments refer to the chief ray being parallel to the optical axis. The chief ray is the central ray of each ray bundle. The remaining rays are all focusing to the image centered on the chief ray. More specifically, this is the case when something is "telecentric in image space." There is also something known as "telecentric in object space" which is the inverse of "telecentric in image space."

However, there are other possible configurations where a telecentric objective lens is not required. If telecentricity does not exist in the collection optics, the central ray of each of the field points as they leave the objective lens toward the focal plane will not be parallel to the optical axis. If this is the case, the geometry of the local oscillator would have to modified to accommodate this. This would be easily done by adjusting the divergence of the local oscillator beam, as it is incident on the micro-lens array. In the general case, where the objective lens is not telecentric, the local oscillator beam would be launched onto the micro lens array with a convergent or divergent beam. The requirements for this divergence could be computed by ray tracing the field points (incident on the FPA) backwards, through the beam splitter 40, and backwards through the micro-lens array 30.

In the configuration depicted in FIG. 3, the focal length of the local oscillator injection lens 32 and the objective lens 42 are equal. This implies that the matrix dimensions of the micro-lens array 30 are identical to that of the focal plane. However if it is desirable that the micro-lens array 30 be of a different size as the focal plane array 22, then this can be achieved by making the focal lengths of these lenses different.

Electronic image detection logic may be operatively coupled to the focal plane array 22 in order to construct digital data as a digital representation of the image for display on a monitor. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

According to another embodiment, an extended field heterodyne detection apparatus comprises a local signal oscillator, a micro-lens array, set in optical relation to the local signal oscillator, situated to multiplex a beam from the local signal oscillator, a local oscillator injection lens, in the optical path of the local oscillator and the micro-lens array a semi-reflective beam splitter at the telecentric stop of the local oscillator injection lens, situated to reflect the beam of the local oscillator in parallel to a signal beam passing through the semi-reflective beam splitter, an objective lens, with a stop, situated such that the stop is located at the semi-reflective beam splitter, and a focal plane array, situated to receive the source beam.

In operation, a method for the extended field heterodyne detection apparatus 20 may comprise the steps of receiving the multiplexed first beam 26 from the local signal oscillator 24 at the beam splitter 40. Then, receiving the signal carrying second beam 36 from an object field at the beam splitter 40 and wherein the first beam 26 is mode-matched to the signal second beam 36. Then, propagating the first and second beams 26, 36 collimatedly from the beam splitter 40 to the focal plane detector array 22, wherein the first beam 26 and the second beam 36 are parallel at the focal point array 22. Additionally, the method may further comprising the steps of mixing the first and second beams 26, 36 in a square-law detector, wherein each pixel in the focal plane array 22 is mixed simultaneously. The method may still further comprise the steps of: equaling a number of lenslets 56 carried by a micro-lens array 30 with a number of pixels carried by the focal plane detector array 22. Then, transmitting the oscillated first beam 26 through the lenslets 56 to create a number of beamlets 54 equal to the number of pixels in the focal plane detector 22. Then, aligning the beamlets 54 parallel to the signal carrying second beam 36 at each pixel on the focal plane detector array 22.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

What is claimed:

1. An extended field heterodyne detection apparatus comprising:
   a local signal oscillator having an exit;
   an oscillated first beam transmitted from the exit of the local signal oscillator along an optical first path;
   a micro-lens array set in optical relation with the local signal oscillator multiplexing the oscillated first beam into a plurality of beamlets;
   a local oscillator injection lens in optical relation with the micro-lens array;
   a first stop in optical relation with the local oscillator injection lens, wherein the local oscillator injection lens is interposed optically between the micro-lens array and the first stop;
   a signal second beam transmitted from a target field of view along an optical second path, wherein the optical first and second paths intersect at the first stop;
   a semi-reflective beam splitter positioned at a similar location as the first stop where the optical first and second paths intersect and the beam splitter reflecting the oscillated first beam parallel to the signal second beam passing through the semi-reflective beam splitter;
   an objective lens set in optical relation with the beam splitter;
   a focal plane detector array positioned in optical relation with the first stop;
   an optical third path extending from the first stop to the focal plane array; and
   a combined beam formed from a combination of the oscillated first beam parallel to the signal second beam transmitting along the optical third path to the focal plane array, wherein the oscillated first beam and the signal second beam forming the combined beam are parallel at the focal plane detector array such that the oscillated first beam is mode-matched with the signal second beam.

2. The extended field heterodyne detection apparatus of claim 1 wherein the local signal oscillator is a single laser device having a collimated beam.

3. The extended field heterodyne detection apparatus of claim 2 wherein the signal second beam is transmitted from a target that encompasses a field of view.

4. The extended field heterodyne detection apparatus of claim 3, further comprising:
   a second stop in optical relation with the first stop and the second stop positioned at a similar location as the first stop; and
   a square-law detector, wherein the square-law detector mixes the oscillated first beam and the signal second beam.

5. The extended field heterodyne detection apparatus of claim 4, further comprising:
   a plurality of pixels in the focal plane detector array;
   wherein the number of pixels equals the number of beamlets.

6. The extended field heterodyne detection apparatus of claim 5, wherein the objective lens includes:
   a front focal plane associated with the focal plane detector array, wherein the first and second stops are located at the same location as the front focal plane.

7. The extended field heterodyne detection apparatus of claim 6, further comprising:
   an entrance pupil located at the same location as the first and second stops.

8. The extended field heterodyne detection apparatus of claim 6, further comprising:
   at least one relay lens interposed optically between the beam splitter and the objective lens to relay one of the beams onto the beam splitter.

9. The extended field heterodyne detection apparatus of claim 6, wherein the injection lens has a focal length equal to that of the micro-lens array.

10. The extended field heterodyne detection apparatus of claim 9, wherein the micro-lens array includes:
    a plurality of lenslets, wherein the number of lenslets is equal to the number of pixels.

11. The extended field heterodyne detection apparatus of claim 10, wherein each one of the plurality of lenslets includes an F/number equal to the objective lens F/number.

12. The extended field heterodyne detection apparatus of claim 1, wherein the objective lens is telecentric.

13. The extended field heterodyne detection apparatus of claim 1, wherein the apparatus is not telecentric and a central ray of each point from the target field of view is not parallel to an optical axis of the apparatus.

14. The extended field heterodyne detection apparatus of claim 13, further comprising an adjustment mechanism on the local signal oscillator to create divergence of the first beam.

15. The extended field heterodyne detection apparatus of claim 13, wherein the oscillated first beam is launched onto the micro-lens array with one of the following: (i) a convergent beam, and (ii) a divergent beam.

16. The extended field heterodyne detection apparatus of claim 1, wherein focal lengths of the local oscillator injection lens and the objective lens are equal.

17. The extended field heterodyne detection apparatus of claim 1, wherein matrix dimensions of the micro-lens array and the focal plane array are equal.

18. A method comprising the steps:
    receiving a multiplexed first beam from a local signal oscillator at a beam splitter;
    receiving a signal carrying second beam from an object field at the beam splitter and wherein the first beam is mode-matched to the signal second beam;
    propagating the first and second beams collimatedly from the beam splitter to a focal plane detector array, wherein the first beam and the second beam are parallel and mode-matched at the focal plane detector array;
    mixing the first and second beams in a square-law detector, wherein each pixel in the focal plane detector array is mixed simultaneously;
    equaling a number of lenslets carried by a micro-lens array with a number of pixels carried by the focal plane detector array;
    transmitting the oscillated first beam through the lenslets to create a number of beamlets equal to the number of pixels in the focal plane detector array; and
    aligning the beamlets parallel to the signal carrying the second beam at each pixel on the focal plane detector array.

* * * * *